United States Patent

Iobal

[11] 3,890,346
[45] June 17, 1975

[54] PROCESS FOR THE PREPARATION OF N-ARYLPHTHALIMIDINES

[75] Inventor: Abul Fateh Mohammed Iobal, Glattbrugg, Switzerland

[73] Assignee: Monsanto Company, St. Louis, Mo.

[22] Filed: Mar. 12, 1973

[21] Appl. No.: 340,134

[30] Foreign Application Priority Data

Mar. 22, 1972  Switzerland.......................... 4213/72

[52] U.S. Cl............................................. 260/325 PH
[51] Int. Cl............................................. C07d 27/50
[58] Field of Search............................... 260/325 PH

[56] References Cited
UNITED STATES PATENTS 3,390,149   6/1968   Kranz et al. ..................... 260/325 X

*Primary Examiner*—Joseph A. Narcavage

[57] ABSTRACT

N-Arylphthalimidines of formula

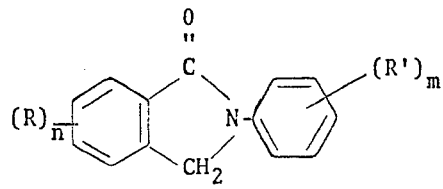

where R and R' are hydrogen atoms, halogen atoms or organic groups such as occurring in ortho-phthalaldehydes and $n$ and $m$ are integers of from 1 to 3, are produced by heating an orthophthalaldehyde of formula

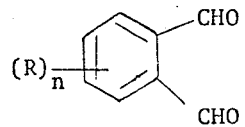

with an aromatic nitro compound of formula

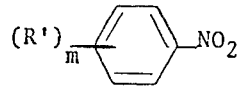

under carbon monoxide pressure in presence of a basic tertiary amine or amide and a catalytic amount of a carbonyl compound of a metal of group VIII.

2 Claims, No Drawings

PROCESS FOR THE PREPARATION OF N-ARYLPHTHALIMIDINES

BACKGROUND OF THE INVENTION

1. FIELD OF THE INVENTION

This invention relates to a process for the preparation of N-arylphthalimidines. In a particular aspect this invention relates to a process for the preparation of N-arylphthalimidines of the formula

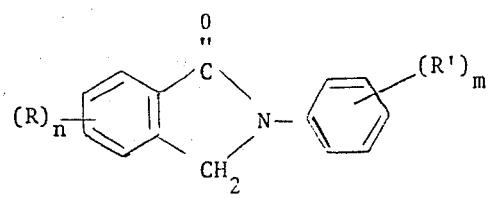

wherein R and R' are hydrogen, halogen, e.g., chloro or bromo, or organic groupings; such as aliphatic, aromatic(substituted and unsubstituted)containing e.g. 1–20 carbon atoms by reacting an ortho-phthaladehyde of the formula

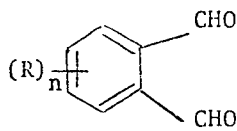

with an aromatic nitro compound of the formula

2. DESCRIPTION OF THE PRIOR ART

Phthalimidines and methods for their preparation have long been known to the art for example from G. Graebe and A. Pictet, Ann.247 (1888) page 302. More recently N-arylphthalimidines have been obtained from O-phthalaldehyde and aryl isocyanates Also I. Yamamoto, Y. Tabo and H. Gotoh in Tetrahedron Lett. (1971) page 2295 have reported the formation of N-arylphthalimidines from O-phthalaldehyde and carbodiimides.

SUMMARY OF THE INVENTION

It has been discovered in accordance with the present invention that N-arylphthalimidines of the formula

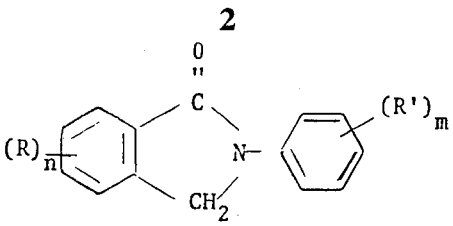

wherein R and R' are defined as above are prepared by reacting an O-phthalaldehyde with an aromatic nitro compound under carbon monoxide pressure in the presence of a basic tertiary amine or amide, the amine or amide being liquid at the temperature of reaction, and a catalytic amount of a carbonyl compound of a metal of Group VIII of the Periodic System. The process of the present invention does not require the employment of aromatic amines, isocyanates or carbodiimides.

DETAILED DESCRIPTION

The process of the present invention proceeds according to the following equation

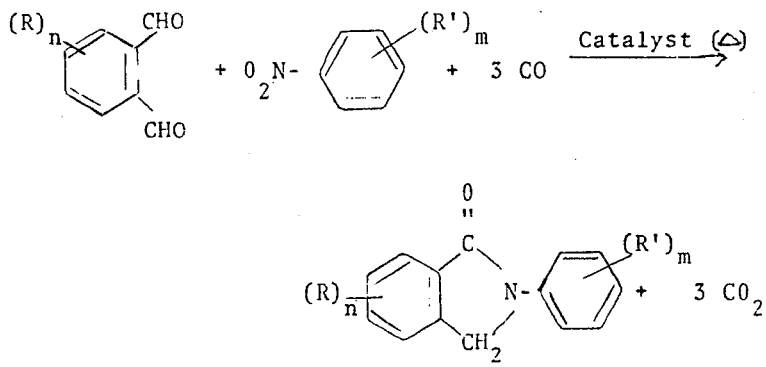

Any aromatic O-dialdehyde in which both aldehyde groups are attached to an aromatic nucleus may be used as the O-phthaldehyde starting material. The O-phthalaldehyde may be either substituted or unsubstituted. It is understood, of course, that any substituent should be "inert," that is, the substituent should not serve to hinder N-arylphthalimidine formation. Examples of typically suitable substituents as represented by R and R' are halogen atoms (chloro, bromo, etc.) mercapto, tertiary amine, cyano, ester groupings, hydrocarbonoxy, monovalent and divalent hydrocarbyl groupings. The divalent hydrocarbyl groupings can be present in the form of di-and polynuclear O-dialdehydes such as O-naphthaline dialdehyde, O-anthracene dialdehyde and O-phenanthrene dialdehyde, and nitro compounds such as nitro napthalene, nitro anthracene, nitro phenanthrene etc. and the like. When aliphatic or cycloaliphatic substituents are present, it is understood that the nitro group or the aldehyde group will be attached to the aromatic entity. The "ester groupings" comprise esters which are linked through the carbon atom as well as through the oxygen atom of the carboxyl group with examples being carbalkoxy and carbaroxy groups such as carbomethoxy and carbophenoxy, and acyloxy groups such as acetoxy and benzoxy. It will be readily apparent that the dialdehydes and nitro compounds employed in the process of the present invention may have two or more substituents with the substituents being in different positions with respect to the aldehyde groups or nitro group.

In carrying out the process of the present invention the carbon monoxide pressure may vary over a wide range, e.g., between about 50 and 300 atmospheres. Likewise the reaction temperature may vary over a wide range with suitable temperatures typically falling in the range of from about 50° to about 250°C. When lower temperatures and pressures are employed, it is preferred to use a strong tertiary base as solvent and a preformed metal carbonyl as catalyst.

The reaction of the present invention requires the presence of a basic tertiary amine or amide. Such suitable bases include triethylamine, N,N-dimethylbutylamine, pyridine, dimethylaminopyridine, N-methylprryolidine, N-ethylpiperidine, dimethylformamide, tetramethyl urea, N,N-dimethylpiperazine, pentamethylguanidine etc. and the like. The strongly basic amines having in aqueous solution a dissociation constant of at lease $pK_a = 10$ are often preferred as previously indicated. Since the bases also can serve as solvent for the reactants bases which are liquid or are dissoved in other suitable liquid solvents at the reaction temperature are employed. It is preferred to use an excess amount of base, e.g., 6 mols per mol of dialdehyde or nitro compound.

The tertiary amines are generally preferred to the basic amides in the process of the present invention. The simple tertiary amides generally do not possess sufficient basicity to promote the reaction. However the weakly basic amides such as dimethylformamide and tetramethyl urea can be suitably employed.

If desired an inert liquid solvent may be employed. In such a case the reaction medium will be liquid even though the amine per se would not be, provided, of course, that the amine and solvent form a homogenous solution.

The catalyst employed in the process of the present invention is a carbonyl compound of a metal of Group VIII of the Periodic System. The particular valency of the metal salt or metal compound as orginally used is not of particular significance since the active metal carbonyl compounds are generally formed during the reaction. Thus the catalyst may be prepared "in situ" or in a separate step. Especially suitable catalysts are rhodium carbonyls such as $Rh_4(CO)_{12}$ and $Rh_6(CO)_{16}$, rhodium carbonyl compounds such as $[RhCl(CO)_2]_2$ and $Rh(CO)_3Cl$, and rhodium oxides such as $Rh_2O_2$ and $Rh_2O_3$. Other suitable rhodium compounds include $RhO_2 \cdot H_2O$, $Rh_2O_3 \cdot 5H_2O$, $RhCl_3$, $RhI_3$, $RhCl_3 \cdot H_2O$ and $Rh(NO_3)_3$. Suitable catalysts and processes for their preparation are known to the art. In the process of the present invention the molar ratio of catalyst to dialdehyde may vary over a wide range with a ratio of in the range of from about 1:100 to about 1:5000 being generally preferred and a ratio of 1:500 being especially preferred.

The following examples illustrate specific embodiments of the invention. In the examples the reactions were carried out in a stainless steel autoclave (30 ml. capacity) with heat being supplied by an external rocking electric oven.

EXAMPLE 1

O-Phthalaldehyde (0.01 mol), p-nitrobiphenyl (0.11 mol), hexarhodiumhexadecacarbonyl ($10^{-5}$ mol) and anhydrous pyridine (5 ml.) were charged to a stainless steel autoclave. The vessel was pressurized with carbon monoxide (150 atmospheres) and the reaction mixture was heated to about 165° – 170°C with about 40 minutes being required to reach that temperature. The temperature was maintained at 165° – 170°C for about 3 hours. On completion of the 3 hour period the contents of the autoclave were permitted to cool, the gases of reaction were vented and the contents were discharged. The discharged contents were then distilled in vacuo to remove pyrrdine and the resulting residue was mixed with stirring with hot methanol (about 15 ml). On cooling microcrystalline N-arylphthalimidine was obtained (60% yield). The crystals were then recrystallized in methanol and chloroform (1:1).

EXAMPLE 2

Additional runs were conducted following the general procedure of Example 1. The results are shown in the Table.

TABLE

| Product R = H R'= | | Yield (%) | Melting Point[a] (°C) | IR ($\mu$ CO)[b] ($\mu$) | $^1$H—NMR —CH$_2$ | Chemical Shift atomatic | (ppm)[c] —CH$_3$ |
|---|---|---|---|---|---|---|---|
| a. | H | 58 | 161–162 | 5.92 | 4.81 | 7.1–8.0 | — |
| b. | H | 0[d] | | | | | |
| c. | p—OCH$_3$ | 42 | 144–145 | 5.99 | 4.66 | 6.75–7.95 | 3.74 |
| d. | m—Cl | 55 | 190–191 | 5.92 | 4.78 | 7.1–8.0 | — |
| e. | m—CH$_3$ | 40 | 143–144 | 5.91 | 4.73 | 6.8–8.0 | 2.36 |
| f. | p—CH$_3$ | 46 | 136–137 | 5.92 | 4.68 | 7.0–8.0 | 2.29 |
| g. | p- | 0[d] | | | | | |
| h. | p- | 60 | 231–233 | 5.93 | 4.87 | 7.2–8.1 | |

[a] uncorrected
[b] KBr disc
[c] in CDCl$_3$
[d] benzene substituted for pyridine While the invention has been described with reference to particular embodiments thereof, it will be appreciated that modifications and variations are possible without departing from the invention.

I claim:

1. A process for the preparation of N-arylphthalimidine of the formula

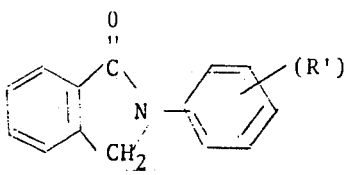

wherein R' is a member selected from the group consisting of hydrogen, halogen, methoxy, methyl and phenyl, and which comprises reacting at a temperature of in the range of from about 50° to about 250°C. and under a pressure on in the range of from about 50 to about 300 atmospheres an O-phthlaldehyde of the formula

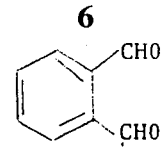

with an aromatic nitro compound of the formula (R')—NO₂ wherein R' is defined as above under carbon monoxide pressure in the presence of pyridine and a catalytic amount of a rhodium carbonyl compound.

2. The process of claim 1 wherein the catalyst is hexarhodiumhexadecarcarbonyl.

* * * * *